United States Patent [19]
Araujo et al.

[11] Patent Number: 6,097,720
[45] Date of Patent: Aug. 1, 2000

[54] ENABLING MULTICAST DISTRIBUTION EFFICIENCIES IN A DIALUP ACCESS ENVIRONMENT

[75] Inventors: Kenneth Araujo, Sunnyvale; Peter Si-Sheng Wang, Cupertino; Cyndi Jung, Menlo Park, all of Calif.

[73] Assignee: 3Com Corporation, Santa Clara, Calif.

[21] Appl. No.: 09/056,284

[22] Filed: Apr. 7, 1998

[51] Int. Cl.[7] .................................................. H04L 12/66
[52] U.S. Cl. .......................... 370/355; 370/390; 370/410; 370/522
[58] Field of Search .................................... 370/390, 401, 370/402, 410, 522, 524, 474, 466, 355

[56] References Cited

U.S. PATENT DOCUMENTS

| | | | |
|---|---|---|---|
| 4,965,798 | 10/1990 | Mostafa et al. | 370/79 |
| 5,563,882 | 10/1996 | Bruno et al. | 370/62 |
| 5,583,997 | 12/1996 | Hart | 709/218 |
| 5,657,452 | 8/1997 | Kralowetz et al. | 395/200.57 |
| 5,680,392 | 10/1997 | Semaan | 370/261 |
| 5,732,071 | 3/1998 | Saito et al. | 370/255 |
| 5,745,884 | 4/1998 | Carnegie et al. | 705/34 |
| 5,768,525 | 6/1998 | Kralowetz et al. | 395/200.58 |
| 5,818,838 | 10/1998 | Backes et al. | 370/390 |
| 5,822,523 | 10/1998 | Rothschild et al. | 709/236 |
| 5,867,660 | 2/1999 | Schmidt et al. | 709/227 |
| 5,870,386 | 2/1999 | Perlman et al. | 370/256 |
| 5,918,019 | 6/1999 | Valencia | 395/200.57 |

OTHER PUBLICATIONS

Arunkumar, N. et al., "Layer Two Tunneling Protocol (L2TP) over AAL5 and FUNI", 3Com Corporation, Mar. 25, 1997, printed from world wide web site "http://www.internic.net/internet-drafts/draft-ietf-pppext-12tp-aal5-funi-00.txt", 11 pages.

Simpson, W. (Editor), "PPP in HDLC-like Framing", Request for Comments 1662, Point-to-Point Protocol Working Group of the Internet Engineering Task Force (IETF), Jul. 1994, printed from worl wide web site "http://ds.internic.net/rfc/rfc1662.txt", 53 pages.

Hamzeh, K. et al., "Layer Two Tunneling Protocol 'L2TP'", Nov. 1997, printed from world wide web site "http://www.internic.net/internet-drafts/draft-ietf-pppext-12tp-08.txt", 132 pages.

Simpson, W. (Editor), "The Point-to-Point Protocol (PPP)", Request for Comments 1661, Point-to-Point Protocol Working Group of the Internet Engineering Task Force (IETF), Jul. 1994, printed from world wide web site "http://ds.internic.net/rfc/rfc1661.txt", 108 pages.

*Primary Examiner*—Min Jung
*Attorney, Agent, or Firm*—Paul Davis; Wilson Sonsini Goodrich & Rosati

[57] ABSTRACT

In a network having one or more intermediate devices coupled to end stations by respective links, and including a multicast source end station such as a remote access server for an Internet service provider, and a plurality of multicast receiving end stations, such as customer premises equipment CPE, coupled to an intermediate device in the network, a method for distributing multicast distribution functions to the intermediate device is described. The method comprises establishing point-to-point sessions between the source end station and the plurality of receiving end stations according to a communication protocol such as the PPP. Also, a point-to-point session is established between the multicast source end station and the intermediate device by which the source end station feeds multicast messages to the intermediate device that are directed to a set of multicast groups. The method involves transmitting from end stations in the plurality of receiving end stations to the intermediate device respective multicast join messages. The multicast join messages include information identifying one or more multicast groups for the respective receiving end stations to join. In this way, the intermediate device is enabled to forward multicast messages directed to a particular multicast group in the set of multicast groups to the receiving end stations which have joined the particular multicast group.

22 Claims, 8 Drawing Sheets

6,097,720

ENABLING MULTICAST DISTRIBUTION EFFICIENCIES IN A DIALUP ACCESS ENVIRONMENT

RELATED APPLICATIONS

This application is related to non-provisional application, entitled "Point-to-Point Protocol With A Signaling Channel," by inventors, Kenneth Araujo and Peter Si-Sheng Wang, having Ser. No. 09/056,280, and filing date Apr. 7, 1998, which was filed on the same day as the instant application; and to non-provisional application, entitled "Session Establishment For Static Links In Point-to-Point Protocol Sessions," by inventors, Kenneth Araujo and Peter Si-Sheng Wang having Ser. No. 09/056,258, and filing date Apr. 17, 1998, which was filed on the same day as the instant application; and to non-provisional application, entitled "Distribution Of Protocol Processes From Network Elements To End Stations," by inventors Kenneth Araujo, Peter Si-Sheng and Cheng Chen having Ser. No. 09/056,281, and filing date Apr. 7, 1998, which was filed on the same day as the instant application.

BACKGROUND OF THE INVENTION

1. Field of the Invention

The present invention relates to data communications, and more particularly to techniques for improving multicast distribution efficiencies in a dialup access environment.

2. Description of Related Art

Local loops connect modems at customers premises to a central office switch on the public switched telephone network. At the central office switch, the telephone connection is routed to its destination, either directly or through other equipment in the network. As data traffic increases, the companies that provide access to Internet Service Providers ISPs across their telephone networks (access providers) are diverting the data traffic off of the voice networks into networks more suited for data traffic or packet switched traffic. Thus, the central office switches are configured with a concentrator and multiplexer for data traffic which is split off of the voice traffic. The communication of the data traffic from the central office switch to a remote access server or other destination is processed by the concentrator/multiplexer to optimize use of the access provider's available bandwidth. For example, access providers are beginning to deploy equipment that diverts calls destined for Internet Service Providers off of the voice switching network, which terminates calls, extracts PPP packets and encapsulates the packets within logical connections in a tunnel. A tunnel is a communication channel which operates according to a tunneling protocol, including the point-to-point tunneling protocol PPTP, the layer 2 forwarding protocol L2F, the layer 2 tunneling protocol L2TP and equivalent protocols. The logical connections within a tunnel are used as a means for multiplexing the data from several users into a single tunnel.

Multicast applications are becoming increasingly popular over the Internet. These applications make use of the following interactions between Customer Premises Equipment (CPE) and an ISP's Remote Access Server (RAS):

Each endpoint that wishes to listen to a multicast feed joins the appropriate group by issuing an IGMP Join message towards the ISP RAS. The group will have a particular IP multicast address associated with it. The IGMP Join message is targeted to this multicast address.

The ISP RAS will process all messages addressed to multicast group addresses. It will process the IGMP Join message, and become aware that the CPE wishes to receive the multicast feed. It will then replicate the multicast feed, and send it over a PPP session between itself and the CFE.

With multiple CPE issuing Joins, each CPE will receive its individual stream over its PPP session with the RAS. Thus, the RAS will replicate the data it receives for a multicast, and send it as individual streams over PPP sessions to individual CPE. This means that Wide Area Network (WAN) resources of the carrier have to be deployed to handle these replicated streams. With the advent of high bandwidth access such as Asymmetric Digital Subscriber Loop (ADSL) technology, each subscriber could receive several Mb/sec of traffic via a multicast feed. Replicating this places an onerous load on carrier networks, and requires expensive deployment of equipment to provide the needed capacity.

SUMMARY OF THE INVENTION

The present invention provides a technique by which multicast distribution and concentration functions are applied to reduce the bandwidth required in an access provider's network having many sources of multicast data. Thus, in a network having one or more intermediate devices coupled to end stations by respective links, and including a multicast source end station such as a remote access server for an Internet service provider, and a plurality of multicast receiving end stations, such as customer premises equipment CPE, coupled to an intermediate device in the network, the present invention provides a method for distributing multicast distribution functions to the intermediate device. The method comprises establishing point-to-point sessions between the multicast source end station and the plurality of receiving end stations according to a communication protocol such as the PPP. Also, a point-to-point session is established between the multicast source end station and the intermediate device by which the source end station feeds multicast messages to the intermediate device that are directed to a set of multicast groups. The method involves transmitting respective multicast join messages from end stations in the plurality of receiving end stations to the intermediate device. The multicast join messages include information identifying one or more multicast groups for the respective receiving end stations to join. In this way, the intermediate device is enabled to forward multicast messages directed to a particular multicast group in the set of multicast groups to the receiving end stations which have joined the particular multicast group. Finally, the process involves forwarding such multicast messages received at the intermediate station in the point-to-point session between the multicast source and the intermediate device, and directed to a particular multicast group, from the intermediate device to the receiving end stations which have joined the particular multicast group.

Furthermore, the method involves maintaining data in the intermediate device which maps multicast groups in the set of multicast groups to receiving end stations for which multicast join messages have been received. The distribution of multicast messages is managed by the intermediate device according to the data maintained in the intermediate device.

According to one aspect of the invention, the multicast join messages comprise messages transmitted in-band of the communications protocol of the point-to-point sessions between the source end station and the plurality of receiving end stations. The intermediate device includes resources that monitor the packets formatted according to the communication protocol of the point-to-point sessions between the source end station and the plurality of receiving end stations to detect the multicast join messages. According to another aspect of the invention, the multicast join messages comprise data frames formatted according to the communication protocol of the point-to-point sessions. A reserved field in the data frames is utilized for carrying an indicator that the data frame includes the multicast join message. For example, when the protocol of the point-to-point sessions is the PPP, the reserved field includes the protocol field specified for PPP protocol identification functions, carrying a signaling code, followed by additional data in the PPP payload to specify the join.

According to alternative aspects of the invention, the point-to-point session between the intermediate device and the multicast source end station comprises the same communication protocol as used between the receiving end stations and the multicast source end station. According to another alternative, the communication protocol used between the intermediate device and the multicast source end station is different than the communication protocol used between the receiving end stations and the multicast source end station. For example, the point-to-point session between the multicast source and the intermediate device uses a multicast routing protocol, while the sessions between the receiving end stations and the multicast source do not use any multicast routing protocol. These sessions are established using a protocol over an ATM virtual circuit, a frame relay virtual circuit, a PPP session over a SONET connection, or otherwise.

From the point-of-view of the receiving end station, the present invention can be characterized as establishing a point-to-point session between the source end station and the receiving end station according to the communication protocol such as the PPP. The receiving end station transmits a multicast join message on the point-to-point session. The multicast join message is formatted according to an in-band signaling channel carried on the point-to-point session as mentioned above. This enables the intermediate device to forward multicast messages from the source end station and directed to a particular multicast group, to the receiving end station.

The present invention provides a communication protocol designed for managing the communication between peers, such as the PPP, by including a signaling channel in frames formatted according to the communication protocol, and used for multicast management on the access provider's network. The signaling channel is utilized by intermediate devices in the access provider network, such as equipment at central office switches or other concentration points in the network, to facilitate the management of the flow of data traffic in the access provider network. The signaling channel according to one aspect of the invention is identified in the intermediate devices and in the end stations by a particular value or values in the protocol field of the PPP encapsulation format. The intermediate device is configured to monitor the protocol field, and when one of the particular values is recognized, to process the frame at the intermediate device. Likewise, the end station is configured to recognize particular values in the protocol field or in following fields of the payload, and to process the packet received according to the signaling channel function specified by that particular value. The multicast distribution resources in the intermediate device are configured using the signaling channel on the PPP so that a single multicast frame from a source end station is forwarded to a plurality of receiving end stations by the intermediate device.

Accordingly, the point-to-point protocol PPP or other point-to-point communication protocol is extended according to the present invention by including a signaling channel by which multicast distribution efficiencies in the access provider network are achieved by enabling intermediate devices to perform concentration and distribution functions.

Other aspects and advantages of the present invention can be seen upon review of the figures, the detailed description, and the claims which follow.

DETAILED DESCRIPTION

Figure 1:
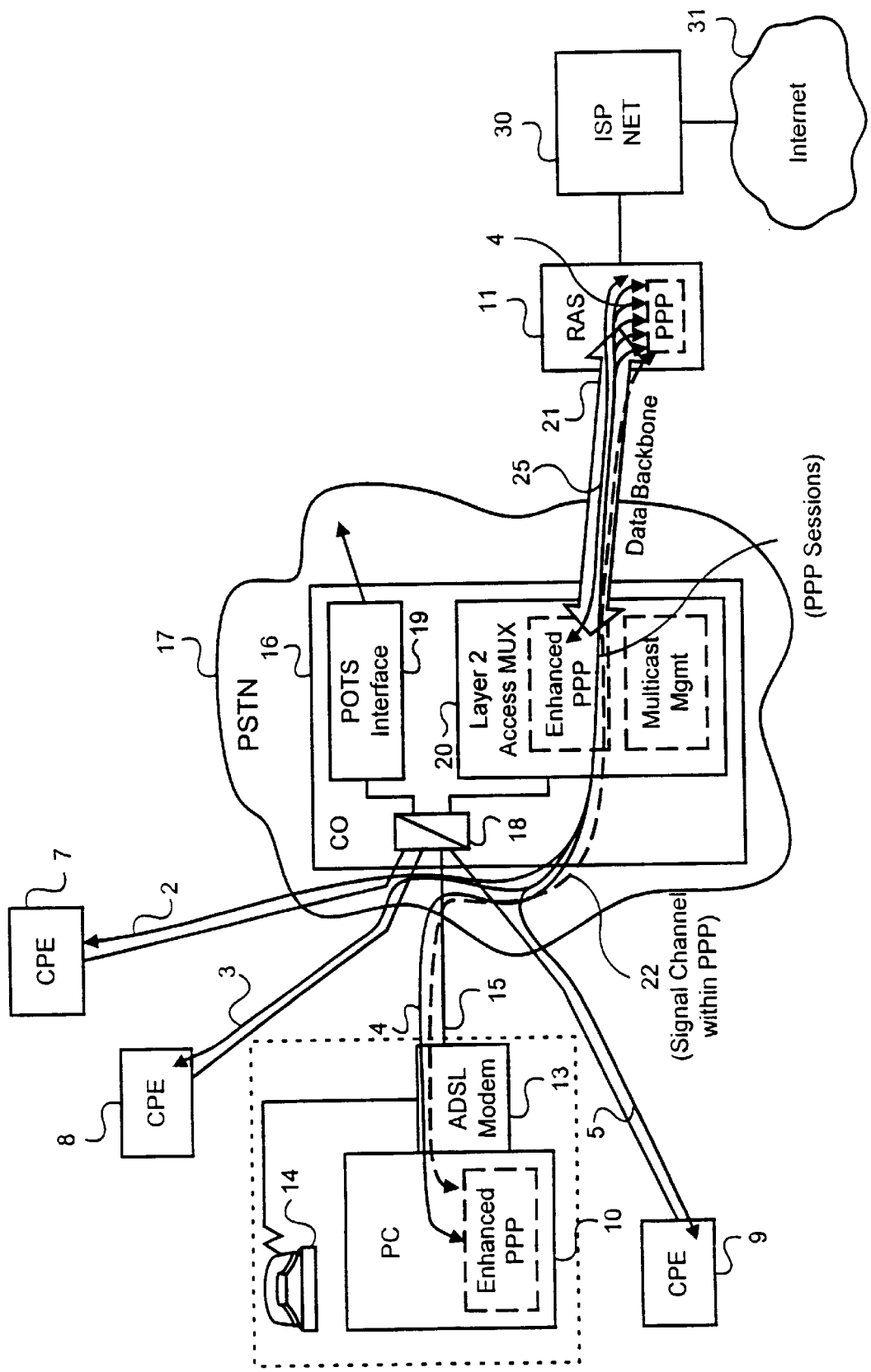
FIG. 1 is a simplified diagram of an example network environment in which enhanced point-to-point protocol of the present invention is used for multicast management.

A detailed description of examples of the present invention is provided with reference to the figures, in which FIG. 1 illustrates a context in which the present invention is used.

FIG. 1 illustrates individual point-to-point sessions 2, 3, 4, 5 between end stations 7, 8, 9, 10, and a remote access server 11, including for example session 4 between a personal computer 10 and a remote access server 11. The point-to-point communication sessions in this example are represented by the arrows 2, 3, 4, 5 and are established according to the Point-to-Point Protocol PPP. The Point-to-Point Protocol, as it is defined, is used for transporting multi-protocol datagrams over point-to-point links. One version of the PPP is described in Request For Comments RFC 1661, published July 1994 by the Point-to-Point Protocol Working Group of the Internet Engineering Task Force IETF. The PPP consists of a specification for encapsulating multi-protocol datagrams, a link control protocol LCP for establishing, configuring and testing the datalink connection, and a family of network control protocols NCPs for establishing and configuring different network layer protocols. According to the PPP, network layer packets are referred to as datagrams. The datagrams are passed to the datalink layer in which they are encapsulated according to the PPP in a packet having a packet header. The packet including the PPP fields and the datagram is passed to the physical layer at which framing such as HDLC-like framing is appended to form a frame in the format received at the physical layer interface. So called HDLC-like framing is described in "PPP in HDLC-like Framing" RFC 1662 published July 1994 by the Point-to-Point Protocol Working Group of the IETF. Other kinds of framing are also used with the PPP, including framing designed to cooperate with asynchronous transfer mode ATM protocols widely used in the public switched telephone network for data communications. For example, ATM framing and FUNI framing are utilized. Upon reception, the frame is stripped of its framing fields, and a packet is passed to the datalink layer. The packet is stripped of its control fields to produce a datagram. The datagram is passed to the network layer at which network layer headers and the like are processed. Use of the PPP provides a simple technique for encapsulating data from a variety of protocols and is used for example across telephone lines between end stations and Internet access providers.

PPP sessions are established between peers. In one typical environment, the peers include equipment located at a customer site referred to as customer premises equipment CPE, and a remote access server RAS operated by an Internet Service Provider ISP. The customer dials a telephone number to access the RAS of the Internet Service Provider. The PPP is utilized to establish the peer to peer connection from the CPE to the RAS.

The personal computer 10 includes a modem 13, which in a preferred embodiment is a high throughput modem such as an asynchronous digital subscriber loop ADSL modem. The modem 13 is connected to a telephone line which can be shared with a standard telephone equipment 14. The modem 13 is connected by a local loop medium such as link 15 to a central office switch 16 in the public switched telephone network PSTN represented by the cloud 17. The central office switch 16 includes a splitter 18 by which data traffic is split, physically or logically, from voice traffic. The voice traffic is supplied to an interface for voice traffic through the network 17 such as a POTS (plain old telephone service) interface 19. Data traffic is routed from splitter 18 to an access multiplexer 20 for connection to a data network managed by the telephone access provider. Alternatively, the function of the splitter can be integrated into the line card of the access multiplexer. Under this scenario, the voice traffic is separated from the data traffic by the access multiplexer. Several voice streams may be multiplexed together by the access multiplexer and sent via one or more interfaces to the PSTN. Similarly, data traffic would be sent over interfaces connected to the carrier's broadband backbone network.

Typically the access multiplexer 20 operates at layer 2 of the network protocol stack, or otherwise operates as a network intermediate device. The access multiplexer 20 provides an edge device for a data backbone network 21 which is coupled to the remote access server 11. The point-to-point session 4 is established from the personal computer 10 through the splitter 18 and access multiplexer 20, across the data backbone 21, such as an ATM virtual circuit, to the remote access server 11. The remote access server 11 in this example is coupled to an Internet service provider network 30, which includes for example a server "farm". The Internet service provider network is in turn coupled to the Internet 31.

The personal computer includes an enhanced point-to-point protocol module according to the present invention. Also the access multiplexer 20 includes an enhanced point-to-point protocol processing module and a multicast management module to handle the signaling channel according to the present invention. The remote access server 11 includes a point-to-point protocol module (preferably but not necessarily enhanced according to the present invention) and operates as the end point, or peer, for the point-to-point sessions 2, 3, 4, 5. According to the present invention, a signaling channel within the point-to-point protocol session is included, represented by the dashed line 22 on session 4. The access multiplexer will continuously monitor for point-to-point frames (prior to establishment of the point-to-point session, during establishment of the point-to-point session, and upon establishment of the point-to-point session). For example, for the PPP-ATM-ADSL case, this monitoring could start once the CONNECT message was sent from the access multiplexer to the CPE. Point-to-point protocol frames carrying a code indicating that they are signaling channel frames are then processed in the enhanced PPP module and multicast management module in the access multiplexer 20.

The signaling channel is identified by a particular value or values in the protocol field of the standard PPP encapsulation, in a preferred example. Alternatively or in combination, other fields, such as the address field of the HDLC-like framing standard for PPP packets are used to identify signaling channel frames. The signaling channel is used to realize multicast distribution efficiencies by transferring multicast filtering and distribution functions from the end stations to the access multiplexer 20.

The access multiplexer 20 also establishes a point-to-point session represented by arrow 25 to the remote access server 11. The point-to-point session 25 operates as a feed channel for receiving multicast packets to be distributed to the end stations with the multicast management resources in the access multiplexer 20. Thus, using the signaling channel, a CPE, such as the computer 10 informs the access multiplexer 20 that it desires to join a multicast group. The access multiplexer 20 then uses channel 25 to join the group on behalf of the CPE 10. When the access multiplexer 20 receives a multicast packet for the group across channel 25, it transfers the packet into the PPP session 4 for CPE 10 and forwards the multicast. The access multiplexer 20 also forwards the multicast packet to the other CPE 6, 7, 8, 9 which have joined the multicast group for which it is intended. Thus, the multicast management module in the access multiplexer 20 stores data indicating the multicast group to which connected CPE have joined, and filters multicasts fed across channel 25 according to the data stored at the access multiplexer 20. This way the remote access server sends one multicast packet to the intermediate device, for distribution to a set of end stations, rather than one to each end station in the set.

The channel 25 can take a variety of formats, including an independent point-to-point session, a point-to-point session according to a protocol, like ATM, different than the protocol used on the session, such as session 4, between the CPE and the remote access server, or even a point-to-point session established in the signaling channel of a PPP session such as session 4 between the remote access server and an end station.

FIG. 1 represents a typical setup for access by a consumer using equipment at the consumers premises to the Internet 31 via an Internet service provider. It can be appreciated when a large number of end stations, such as the personal computer 10, access the single remote access server 11 through an access multiplexer 20, the access multiplexer must have significant processing resources to manage the edge functions. In addition, for multicast traffic originating from a remote access server 11, a large number of point-to-point channels must be utilized for each destination of the multicast packet. By utilizing the signaling channel, the access multiplexer can learn about the multicast needs of CPEs. It can then interact with the RAS, so that a single feed from the RAS can be distributed and filtered to the appropriate CPEs. The interaction with the RAS could have the access multiplexer acting as a proxy for the multicast feed. Alternatively, the access multiplexer could appear to be a multicast router to the RAS.

The environment of FIG. 1 is a simplified depiction. In some environments, the remote access server 11 is also coupled to the PSTN 17 through a central office switch. Also, the access multiplexing functions. executed by the access multiplexer 20 and the data backbone 21 are implemented in some networks between intermediate devices other than central office switches to concentrate traffic over high bandwidth links within the PSTN, which may not be directly coupled to a central office switch. For example, the intermediate device at which the signaling channel is processed may be a router or an ATM switch located in the access provider network. Data from several access multiplexers may be aggregated in the intermediate device which processes the signaling channel.

Figure 2:
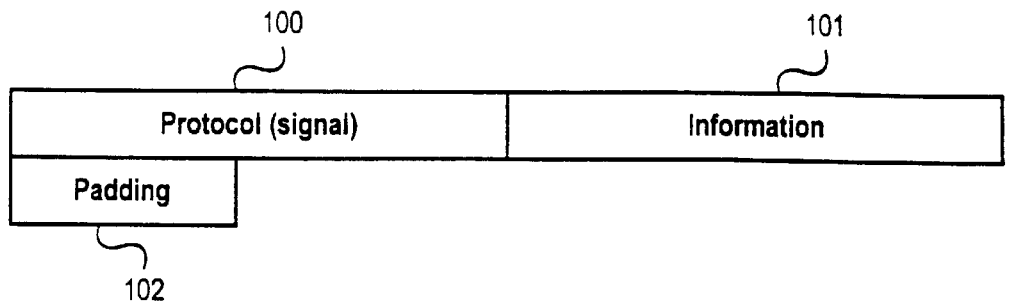
FIG. 2 is a diagram of a packet formatted according to the point-to-point protocol enhanced according to the present invention.

In a PPP session, packets are formatted according to specifications defining the fields shown in FIG. 2. The Protocol field 100 is one or two octets, and its value identifies the datagram encapsulated in the Information field 101 of the packet. For example, if the Protocol field has a value indicating IP, the Information field will contain an IP packet. The Protocol can have other defined values. For example, there is a value indicating a Link Control Protocol (LCP) frame. Such a packet is used by the end points of the PPP session, to agree upon encapsulation format options, handle varying limits on sizes of packets, etc.

The Information field 101 is zero or more octets. The Information field 101 contains the datagram for the protocol specified in the Protocol field 100. The maximum length for the Information field 101, including Padding 102, but not including the Protocol field 100, is termed the Maximum Receive Unit (MRU), which defaults to 1500 octets. By negotiation, consenting PPP implementations may use other values for the MRU.

Figure 3:
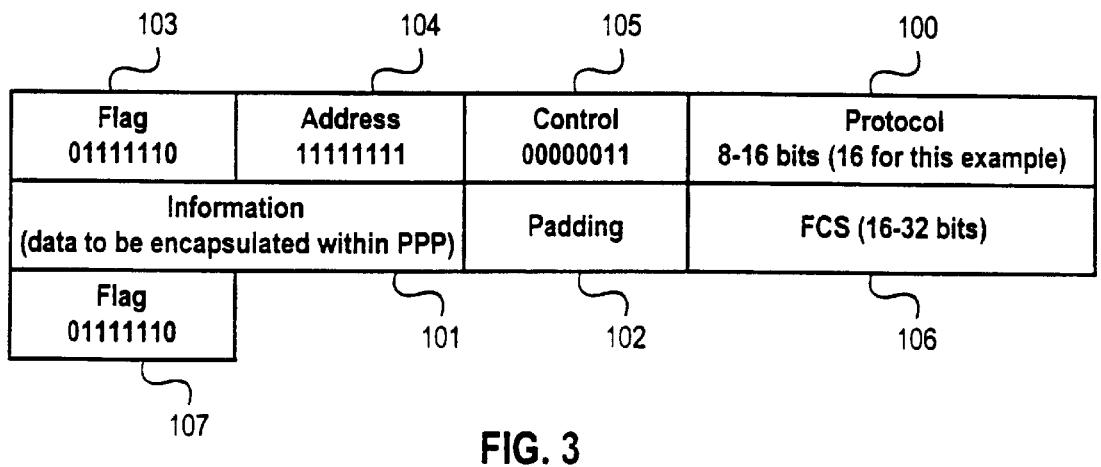
FIG. 3 is a diagram of a frame formatting accorded to the HDLC-like framing overt point-to-point protocol.

When sending the PPP packet as shown in FIG. 2 over an ADSL link, which is a bit-synchronous link, the PPP packet is encapsulated within an HDLC frame as shown in FIG. 3. The Protocol, Information, and Padding fields shown in FIG. 3 are the PPP fields that were described in FIG. 2. Alternatively, the PPP packet will be adapted using AAL5 adaptation and then segmented into ATM cells over the ADSL link (if the PPP-ATM-ADSL stack is being used). A third alternative, which is the PPP-FUNI-ADSL stack, also uses encapsulation based on HDLC, but with different allowed values for certain fields than for PPP-ADSL.

FIG. 3 shows the encapsulation of PPP within HDLC framing. An HDLC frame is started by a flag sequence 103 of '01111110' binary. It is followed by an Address field 104; the only defined value according to the standard that the Address field can have is '11111111' binary. Following the Address field 104 is a Control field 105 with a value of '00000011' binary. Following the Control 105 field is are the PPP Protocol field 100, the PPP Information field 101, and the PPP Padding 102. This is followed by a Frame Check Sequence 106 for the HDLC frame which can be 16 bits or 32 bits. Finally, the HDLC frame is terminated by a closing Flag sequence 107 of '01111110' binary.

Frames belonging to the signaling channel will be identified via a special value, presently not assigned for other uses, of the Protocol field within the PPP encapsulation shown in FIG. 2. For example, a Protocol Field of 16 bits with a value of '1001000000000001' binary could be used to identify a PPP frame associated with the signaling channel.

Figure 4:
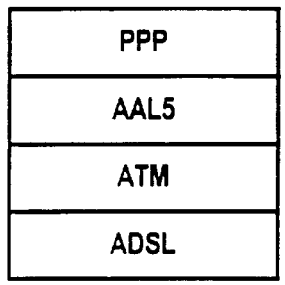
FIG. 4 is an illustration of a protocol stack providing for ATM over AAL5 framing of a point-to-point protocol on an ADSL link.

According to the present invention, the access multiplexer 20 includes resources for identifying PPP frames such as those illustrated in FIGS. 2–4 which carry a signaling protocol value in the protocol field. Such resources include, hardware comparators which compare data at a specific offset within each frame to one or more hard coded values, software resources which perform the comparison function, and combinations of hardware and software. Hardware comparators are preferred in systems requiring fast decisions, or in systems having low processing resources. Software comparison techniques provide greater flexibility and other advantages. In addition to resources for recognizing frames which are part of the signaling channel, the access multiplexer 20 includes an enhanced PPP module that performs the functions specified by this signaling channel frames.

One of the protocol stacks that has been approved for ADSL consists of sending PPP frames using ATM's AAL5 encapsulation of ATM cells running over an ADSL link. FIG. 4 shows the relevant protocol stack.

Figure 5:
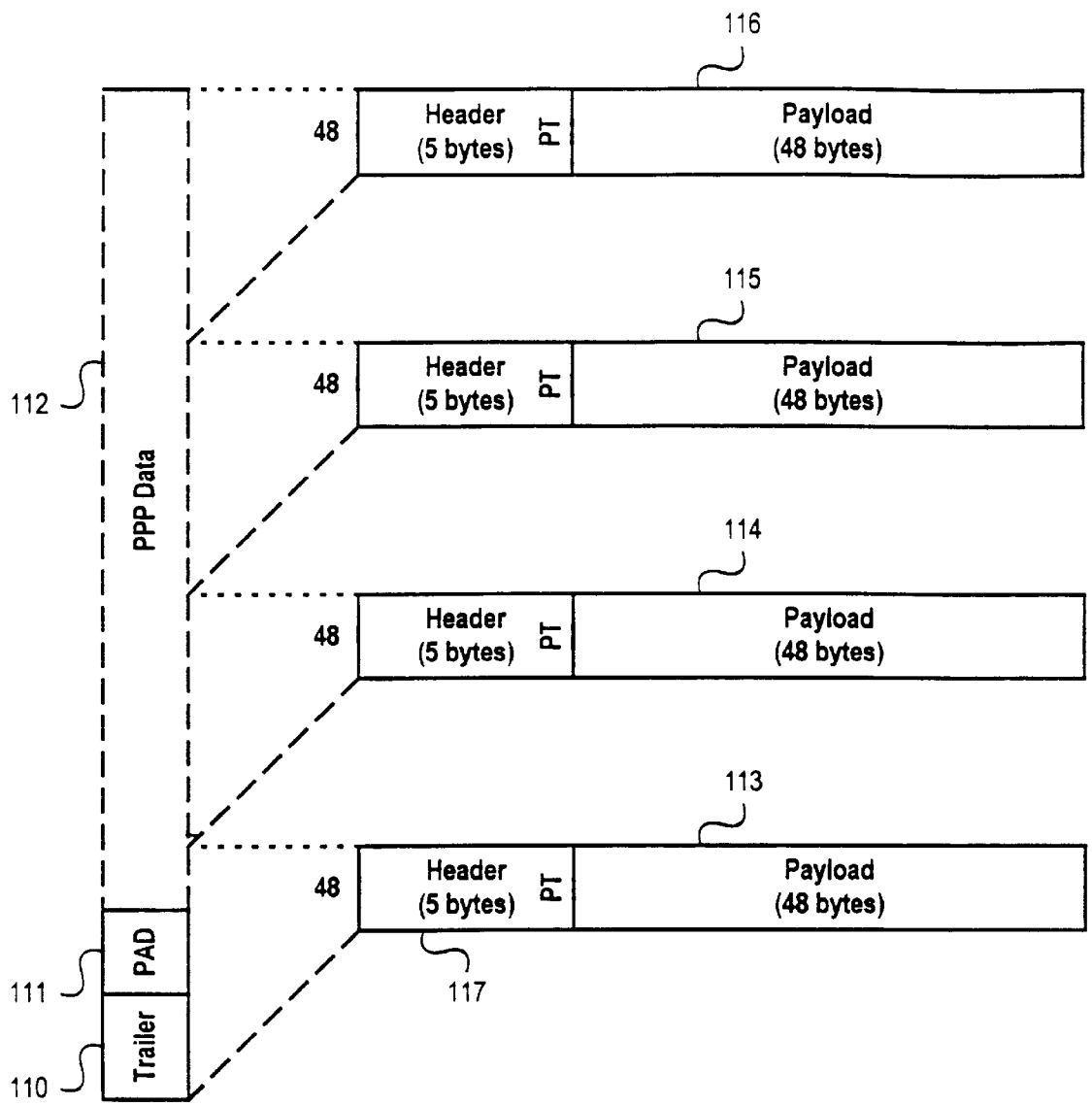
FIG. 5 illustrates the segmenting of a PPP packet into cells using AAL5 encapsulation.

Before segmentation into ATM cells, the PPP data has the format shown in FIG. 2. FIG. 5 depicts the way the segmentation occurs using AAL5. AAL5 consists of adding a trailer 110 to the PPP packet 112. This trailer 110 includes the following fields:

A CPCS UU filed of 1 byte.
A CPI field of 1 byte.
A Length field of 2 bytes.
A CRC of 4 bytes.

The trailer is 8 bytes. Before the trailer 110, PAD bytes 111 are used so that the length of the total frame that is to be converted into cells is a multiple of 48 bytes. The frame is then segmented into cells 116, 115, 114, 113 and so on.

The 5 byte Header (e.g. 117) of each cell contains the Virtual Circuit (VC) information associated with the VC on which the data is being sent. Also included in the header is a PT field which has a specific bit dedicated to AAL5 encapsulation. This bit of the PT field is used in the AAL5 encapsulation to indicate whether or not a cell is the last cell associated with a segmented frame. It is set to '0' in all cells associated with the frame except the last cell, where it is set to '1'.

The ATM Virtual Circuit is terminated at the Access Multiplexer. The Access Multiplexer may take the data from several different CPE and send it on a single, aggregated VC to the ISP Remote Access Server (RAS). This is done to prevent Virtual Circuit explosion in the core of the carrier network (between the access multiplexer and the ISP RAS).

When taking the data from several CPE and multiplexing it onto one VC to the ISP RAS, or taking data associated with several different VCs from a single CPE where each VC carries data from a single PPP session and multiplexing it onto one VC to the ISP RAS, or any combination of the preceding two possibilities, it is necessary to use some multiplexing scheme over the single VC to the RAS so as to be able to identify and separate the data belonging to different PPP sessions. An example of such a multiplexing scheme is the Layer 2 Tunneling Protocol (L2TP).

Figure 6:
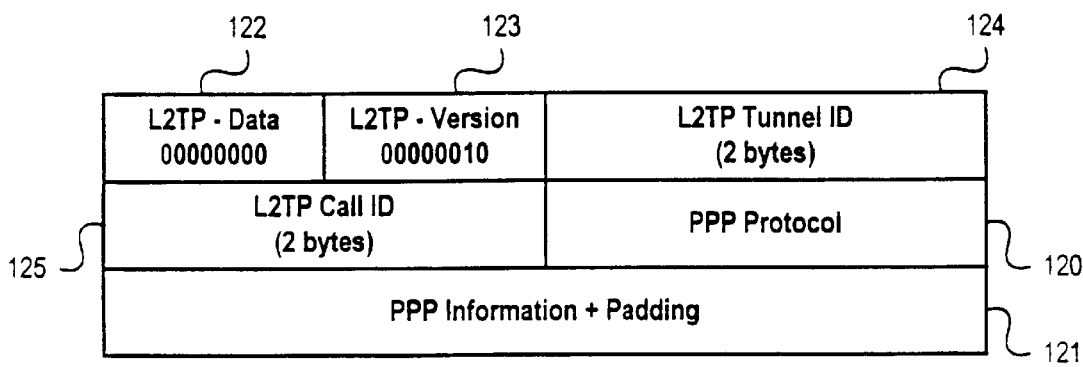
FIG. 6 illustrates encapsulation according to the layer 2 tunneling protocol.

FIG. 6 shows the minimal encapsulation for PPP data packets sent between two L2TP endpoints. For our example, the two endpoints will be the access multiplexer and the ISP RAS. The access multiplexer will multiplex multiple PPP sessions onto a single virtual circuit by using L2TP. The minimal L2TP encapsulation consists of prefixing the PPP packet 120, 121 with a 6-byte L2TP header. The first byte 122 in this encapsulation is set to all zeroes, which indicates an L2TP payload packet using no length field, no send sequence number, and no receive sequence number. The second byte 123 is set to a value of binary '00000010', which is the present L2TP version. The next two bytes 124 are used to define an L2TP Tunnel. An L2TP Tunnel exists between 2 endpoints. Multiple logical connections may be associated with a particular tunnel. Each logical session is defined via the L2TP Call ID 125. PPP data belonging to a particular session from a particular CPE is mapped one-to-one to a particular L2TP Tunnel and logical connection via the L2TP Tunnel ID and L2TP Call ID bytes.

Note that there are two parallel components of L2TP operating over a given L2TP tunnel—control messages between the two tunnel endpoints, and payload packets sent between the endpoints. The payload packets are used to transport L2TP encapsulated PPP packets for user sessions between the tunnel endpoints. The structure of such packets is what is shown in FIG. 6 and what was described earlier.

The actual assignment of Call IDs within a tunnel is accomplished via the exchange of control messages between tunnel endpoints. A control message is indicated by having a value of '1' in the highest order bit of the first byte 112 of an L2TP packet (as opposed to a value of zero, which signifies a payload packet). Independent Call ID values are established for each end of a user session. The sender of a packet associated with a particular session places the Call ID established by its peer in the Call ID header field 125 of all outgoing packets.

Figure 7:
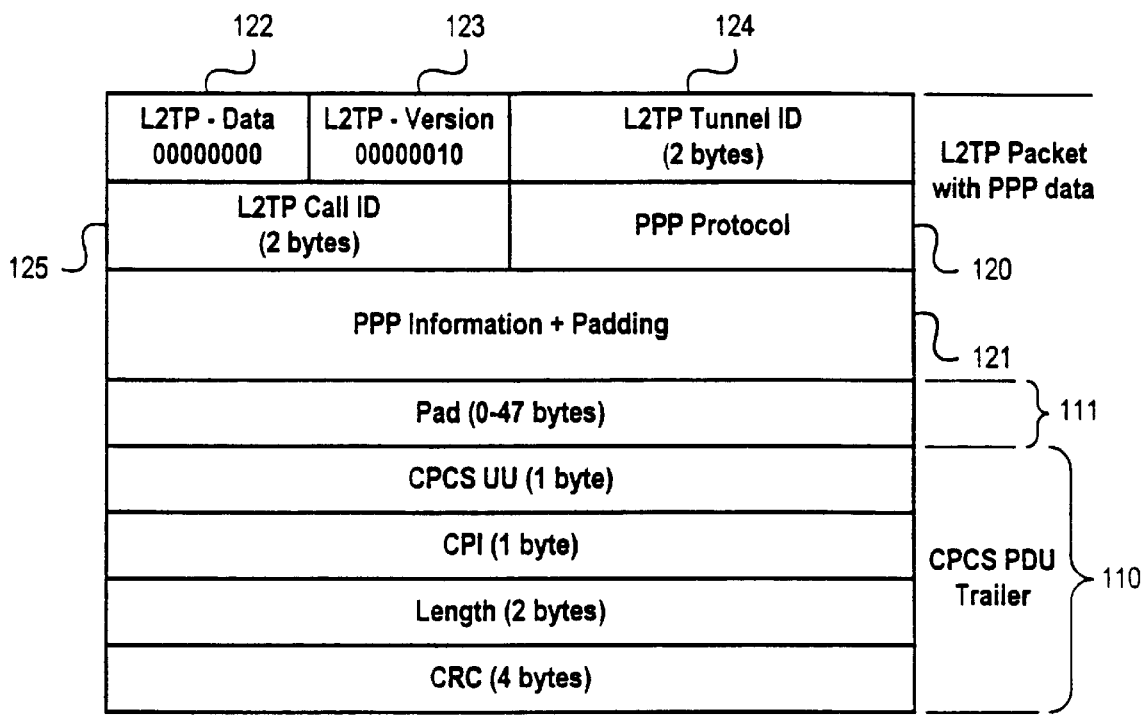
FIG. 7 illustrates the AAL5 adaptation of a layer 2 tunneling protocol L2TP frame.

FIG. 7 shows how the L2TP packet containing the PPP data is encapsulated using AAL5 encapsulation before being segmented into ATM cells using the reference numbers of FIGS. 5 and 6.

Figure 8:
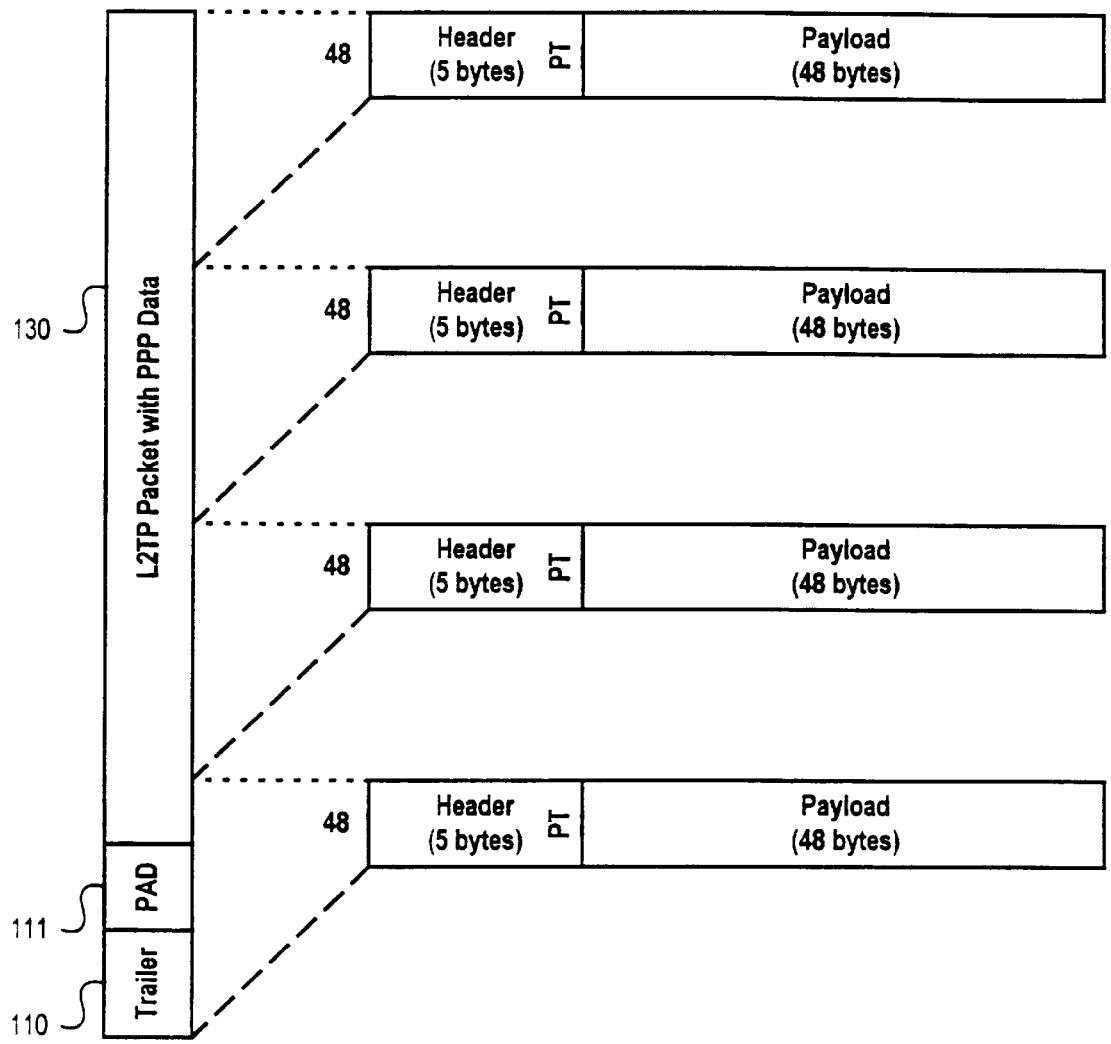
FIG. 8 illustrates the process of sending AAL5 adapted data on a virtual circuit between an access multiplexer and an ISP RAS.

The resulting AAL5 frame is then segmented as shown in FIG. 8.

Note the similarity of FIG. 8 to FIG. 5. In FIG. 5, PPP data from ADSL endpoints was adapted using AAL5 for transmission across a particular VC. In FIG. 8, PPP data from several ADSL endpoints is sent from the access multiplexer to the ISP RAS. This is why the extra L2TP encapsulation (packet 130) is needed—this encapsulation allows for multiplexing the data from the different PPP sessions, where each session will be identified by a unique Tunnel ID and Call ID.

Figure 9:
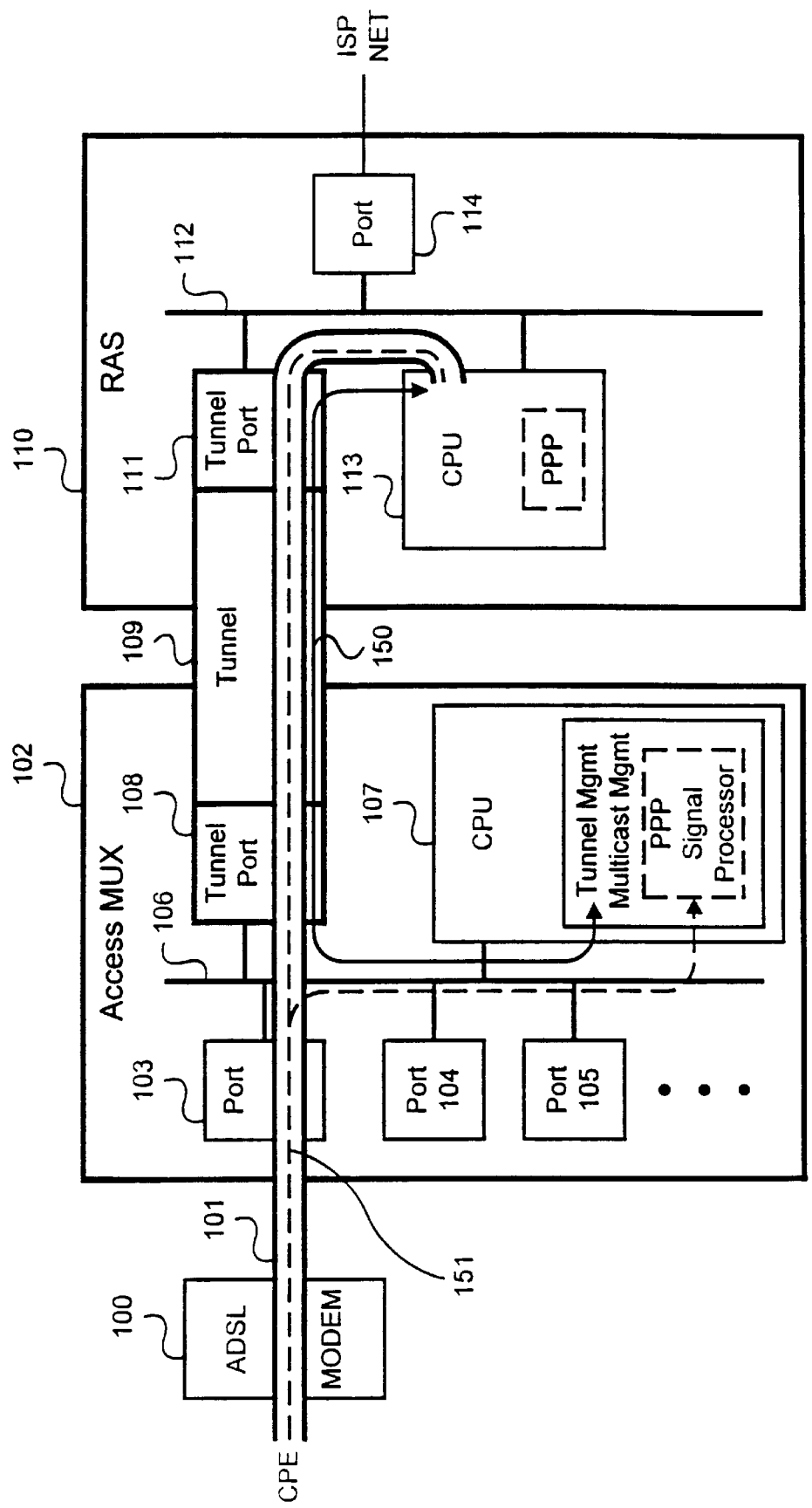
FIG. 9 is a more detailed diagram of a point-to-point communication channel including a signaling channel according to the present invention, where the point-to-point communication channel is established between a customer premises equipment CPE and a remote access server RAS.

FIG. 9 is representative of one example implementation of an access multiplexer and a remote access server according to the present invention. In FIG. 9, an ADSL modem is coupled to customer premises equipment CPE as an end point of a point-to-point session 101. The point-to-point session 101 is established through an access multiplexer 102. The access multiplexer 102 includes a port 103 for communication with the modem 100. Also, a plurality of other ports may be included in the access multiplexer 102 such as ports 104 and 105. The ports 103–105 are coupled to a bus 106. A central processing unit 107 is coupled to the bus 106. The central processing unit 107 includes multicast management resources, tunnel management resources for layer 2 tunneling and a point-to-point protocol signal channel processor. Also coupled to the bus 106 is a port 108 for connection across a backbone communication channel, such as a layer 2 tunnel protocol L2TP tunnel 109. The CPU 107 monitors frames received on port 103 and performs edge functions for transferring the frames through the tunnel 109 to the destination, such as a remote access server 110. The remote access server includes a tunnel port 111, which is coupled to a backbone bus 112. The backbone bus is coupled to a central processing unit 113 in the remote access server which includes a point-to-point protocol module. Also, the remote access server 110 includes a port 114 for connection to a local network, such as an Internet service provider network.

The ports 103–105 include filters for recognizing signaling channel frames (151), and signaling the CPU 107 that PPP signaling processing is required. Alternatively, frames received on ports 103–105 are monitored by software executed by the CPU 107 for edge processing and for PPP signal channel processing.

Use of the signaling channel supports multicast functions. When a dial up paradigm is being used for Internet access, there are different schemes for handling multicast. For example, each user can be sent an individual multicast stream from the Internet service provider. This is inefficient, since many users served by the same access provider's concentration/multiplexing equipment could be listening to the same multicast stream at the same quality of service or cost of service. A much more efficient use of access provider resources is to distribute a single stream from the ISP to the concentration/multiplexing equipment and have that equipment distribute the multicast data to individual subscribers, as can be accomplished using the signaling channel of the present invention.

Note that in FIG. 1, the access multiplexer acts as an Aggregator, terminates the PPP signaling channel from the different endpoints and, by using the capabilities presented in this invention, replicates a multicast flow to the necessary endpoints. Note that the Aggregator can be considered to be a functional entity whose capabilities can be provided at the place in the carrier's network that the carrier considers appropriate. For example, each access multiplexer could implement this capability. Alternatively, this capability could be implemented in some ATM switch (or as an ATM switch adjunct) somewhere in the core of the carrier's network.

Figure 10:
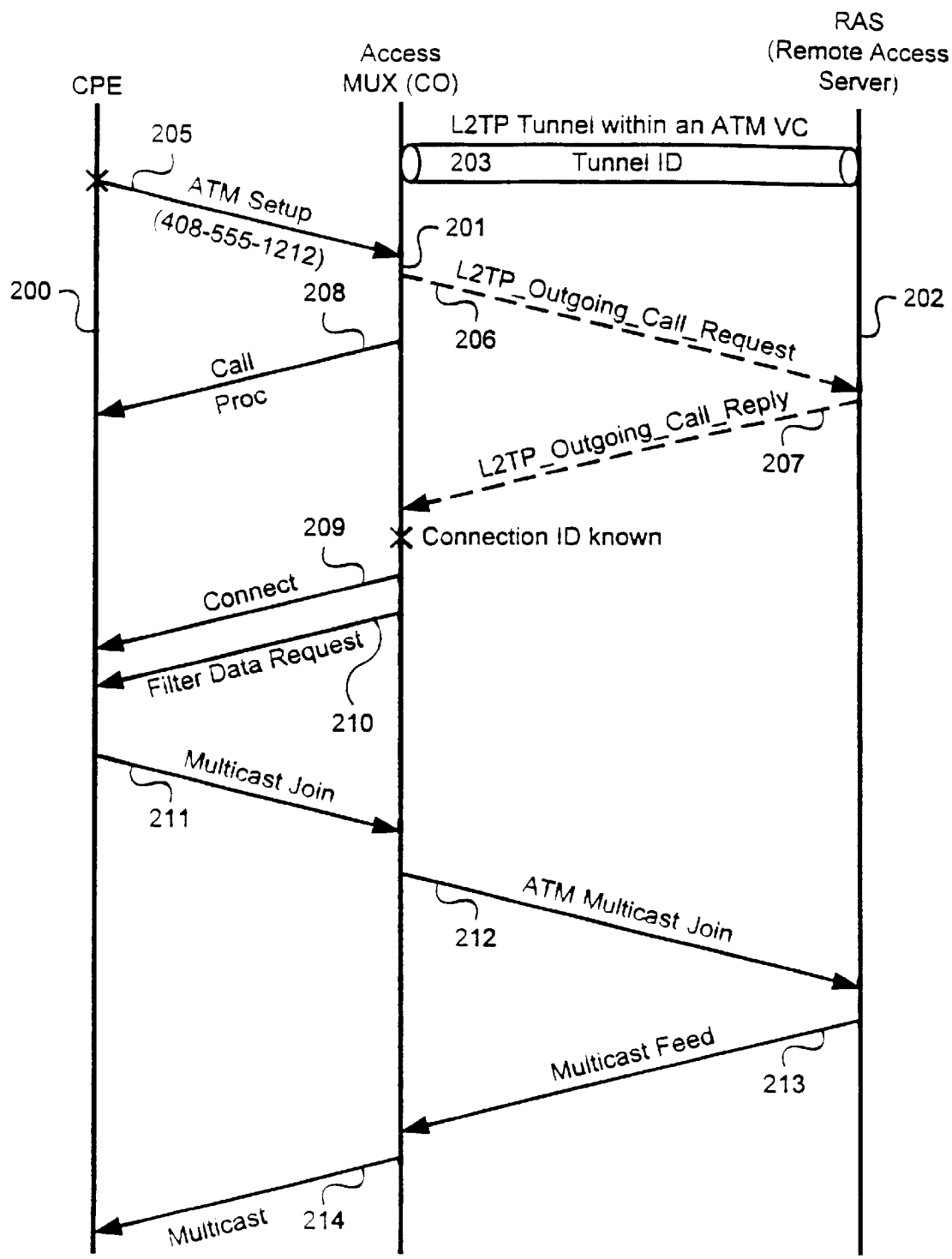
FIG. 10 provides a simplified illustration of signals generating for establishing a point-to-point session between a CPE and a remote access server, and for enabling the access multiplexer to manage multicast distribution according to the present invention.

The procedures described make use of the PPP Signaling Channel existing between the ADSL endpoints and the Aggregator in the carrier's network. For example, the following steps occur:

FIG. 10 illustrates signaling exchange according to one example implementation of a point-to-point communication channel according to the present invention. In FIG. 10, the customer premises equipment is represented by the vertical bar 200. The access multiplexer at the central office, or other aggregator elsewhere in the telephone access provider network, is represented by the vertical bar 201. The remote access server, or other peer end point of the point-to-point channel is represented by the vertical bar 202. In this example, the access multiplexer 201 and the remote access server 202 set up a layer 2 tunneling protocol L2TP tunnel 203. This provides high bandwidth communication for a plurality of point-to-point channels between the access multiplexer 201 and the remote access server 202. In this example, the tunnel 203 is implemented across an ATM virtual circuit within the telephone access provider network.

The customer premises equipment initiates a point-to-point protocol channel by issuing an ATM setup signal 205. The access multiplexer 201 transfers a layer 2 tunneling protocol outgoing call request message 206 to the remote access server 202. The remote access server responds with an outgoing call reply message according to the layer 2 tunneling protocol 207. Meantime, the access multiplexer 201 may issue call proceeding messages 208 to the CPE 200. Upon receiving an outgoing call reply signal 207, the access multiplexer has established a connection identifier—the Tunnel ID and the Call ID fields. The connection identifier being known, a connect signal 209 is issued to the customer premises equipment establishing a channel for a point-to-point connection, by which a communication with the remote access server 201 is provided.

1. On receipt of a new ATM VC from an ADSL endpoint, the Aggregator 201, via the PPP signaling channel, informs the CPE to look for IGMP Join messages and to filter out these messages. It uses a command 210 with the functionality of the Filter_Data_Request command to inform the CPE that it should filter the IGMP Join message. Note that the Filter_Data_Request will include parameters that specify the types of messages to be filtered; the IGMP Join message is one of the messages that can be specified via these parameters. The CPE will send back a positive or negative response to the Aggregator (not shown). (Note—an assumption here is that CPE supports the sending of multicast messages, such as the IGMP Join over PPP links).

2. The CPE 200, before encapsulating outgoing data within PPP packets, checks the data. If the data corresponds to an IGMP Join Message (or one of the other messages specified in the Filter_Data_Request), that message 211 is sent via the PPP signaling channel. Otherwise, the message is sent via the normal path for transfer of user data (Note—if the end station is a multicast router, the messages sent could be those typically associated with a multicast router).

3. On receipt of an IGMP Join message from the CPE 200, the Aggregator 201 implements appropriate procedures to get the multicast flow to the CPE 200. One possible scenario is described below.

4. The Aggregator 201 checks to see if the IGMP Join is from the first CPE that wishes to join the multicast group. If it is, the Aggregator could act as a proxy with the RAS. This would mean that the Aggregator would have an account at the RAS just as any other user. Via this account, the Aggregator would initiate a PPP session between itself and the RAS, and send an IGMP Join 212 over this session. (Note that this PPP session would be multiplexed the same way other user sessions are multiplexed between the Aggregator and the RAS). It would then replicate the received traffic (message 213) to the endpoint that just joined (message 214). As more endpoints join, the Aggregator would replicate the traffic received from the stream to the RAS without needing to involve the RAS at all. The carrier will have to provide the ISP with information on which users listened to which multicast feeds along with the time involved so that the RAS could bill those users as appropriate.

5. Note that the Aggregator could choose to instantiate a new PPP session to the RAS for each multicast group. This could make its job of replicating to the endpoints somewhat easier. A set of endpoints would be associated with receiving the output from one or more PPP sessions.

Alternatively, one PPP session could be used to proxy for all multicast traffic. In this case, the Aggregator would have to reassemble cells into frames and examine the address before distribution to the appropriate endpoints. This is more conservative of VCs, but is more processor intensive.

6. Note that the Aggregator may choose to instantiate several different VCs to the RAS for the same multicast feed, where a new VC could be instantiated due to Quality of Service (QOS) considerations. An example scenario would be an endpoint using the Resource Reservation Protocol (RSVP) to guarantee a higher QOS than that provided by the existing VC for a particular multicast feed. The Aggregator could instantiate a new VC of a higher QOS. It would be an Aggregator option for whether existing VCs of a lower QOS are left up or not. One option would be to leave them up to service endpoints that did not request the high QOS. The other option would be to provide all endpoints with the highest QOS (associated with the VC which is providing the highest QOS).

7. Instead of the Aggregator acting as a user with an account at the RAS, another option would be for the Aggregator to pass through the first IGMP Join from a particular user on the session to the RAS associated with that user. It would then need to examine the data from this session, find the appropriate multicast frames, and replicate these frames to other users that joined the same group. Alternatively, it could build a new VC to the RAS on behalf of the user.

8. Another alternative is for the Aggregator to act as a multicast router in its interactions with the RAS. In this way, it will receive the relevant multicast feeds, and forward them to appropriate endpoints.

Figure 11:
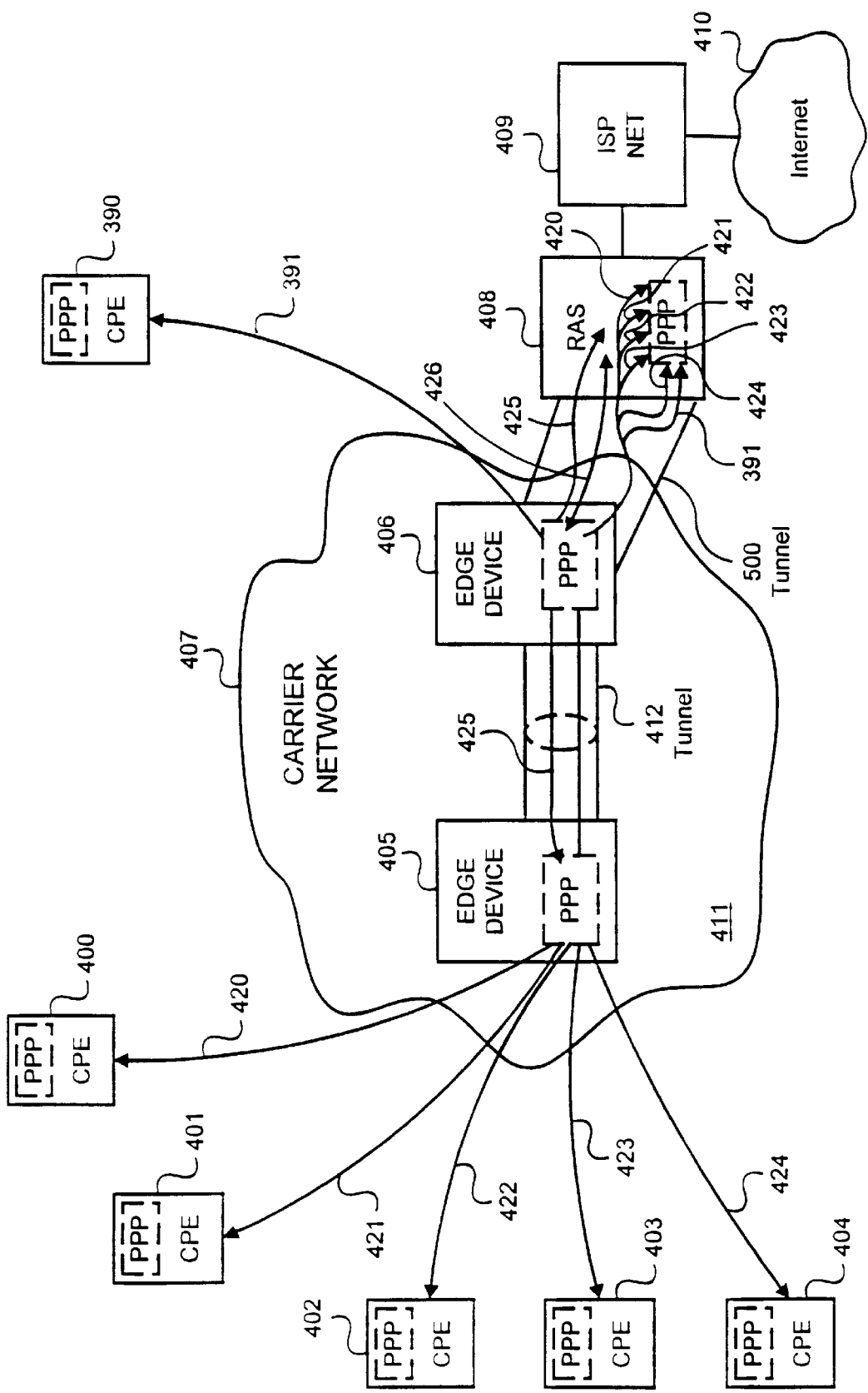
FIG. 11 illustrates an alternative network in which the present invention is implemented, providing for establishing multicast distribution efficiencies at any one of a variety of edge devices or other intermediate devices in a public switched telephone network.

FIG. 11 provides a simplified view of a more complicated network in which the present invention is implemented for the purposes of illustrating certain alternative features. Thus, in FIG. 11 a carrier network 407 includes edge device 405 and edge device 406. The edge devices 405, 406 may comprise access multiplexers in central office switches, or other intermediate devices or aggregators within the network.

The CPE nodes 400, 401, 402, 403, 404 establish point-to-point sessions 420–424 with a remote access server 408 through the edge device 405 and the edge device 406. A backbone tunnel 412 is established between the edge devices 405 and 406 for high throughput traffic. A tunnel 500 also exists between edge device 406 and RAS 408. The CPE 390 establishes a point-to-point session 291 through edge device 406 with the remote access server 408. Each of the edge devices 405 and 406 establish respective point-to-point sessions 425, 426 with the remote access server 408 as well, for the purposes of receiving the multicast feeds. Remote access server 408 is coupled to an Internet service provider network 409 which is in turn coupled to the Internet 410.

The edge devices each establish multicast feeds through their respective point-to-point sessions 425, 426. The multicast feeds are distributed by the edge devices using the signaling channels of the PPP sessions 420–424 and 391 as discussed above.

In an alternative system, the edge device 406, rather than device 405, is configured to distribute multicast feeds to the CPE nodes 400–404 or vice-versa.

Thus it can be seen that the public switched telephone network 407 may include a variety of aggregators or intermediate devices with which multicast distribution functions can be optimized. Utilizing the signaling channel in-band of the communication sessions 420–424 and 391, multicast distribution management is accomplished efficiently, and without requiring complex special purpose protocol exchanges between the participants in the multicast network.

This invention provides a means for decreasing the bandwidth needs in the carrier's core WAN backbone. This is achieved via coordination between ADSL endpoints and Aggregators in the carrier's network that occurs via the PPP Signaling Channel. Accordingly, the present invention provides an extension to the point-to-point protocol that allows for interactions between end points of the point-to-point session and intermediate network devices involved in the transfer of data between the end points. The channel is used to relieve congestion in the intermediate devices that arise due to multicast distribution.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. In a system including a network having one or more intermediate devices coupled to end stations by respective links, including a multicast source end station and a plurality of multicast receiving end stations coupled to an intermediate device in the network, a method for distributing multicast distribution functions to the intermediate device, comprising:

establishing point-to-point sessions between the source end station and the plurality of receiving end stations according to a communication protocol;

establishing a point-to-point session between the source end station and the intermediate device by which the source end station feeds multicast messages to the intermediate device directed to a set of multicast groups;

transmitting from end stations in the plurality of receiving end stations to the intermediate device respective multicast join messages, the multicast join messages including information identifying one or more multicast groups for the respective receiving end stations to join, so that the intermediate device is enabled to forward multicast messages directed to a particular multicast group in the set of multicast groups to the receiving end stations which have joined the particular multicast group; and forwarding multicast messages received at the intermediate station in the point-to-point session between the multicast source and the intermediate device, and directed to a particular multicast group in the set of multicast groups from the intermediate device to the receiving end stations which have joined the particular multicast group.

2. The method of claim 1, wherein the communication protocol comprises a Point to Point Protocol PPP.

3. The method of claim 1, wherein the multicast join messages comprises data frames formatted according to the communication protocol of the point-to-point session between the receiving end stations and the source end station, and including a reserved field, and said transmitting to the intermediate device includes sending a data frame from the receiving end station in the session including an indicator in the reserved field that the data frame includes the multicast join message.

4. The method of claim 2, wherein the multicast join messages comprises data frames formatted according to the PPP, and including a reserved field, and said transmitting to the intermediate device includes sending a data frame from the receiving end station in the session including an indicator in the reserved field that the data frame includes the multicast join message, and the reserved field comprises a protocol field specified for PPP protocol identification functions.

5. The method of claim 1, wherein the step of forwarding comprises sending packets formatted according to the communication protocol of the point-to-point session between the receiving end stations and the source end station.

6. The method of claim 1, wherein the step of establishing a point-to-point session between the multicast source and the intermediate device comprises establishing a point-to-point session according to the communication protocol of the point-to-point session between the receiving end stations and the source end station.

7. The method of claim 1, wherein the step of establishing a point-to-point session between the multicast source and the intermediate device comprises establishing a point-to-point session according to a communication protocol different than the communication protocol of the point-to-point session between the receiving end stations and the source end station.

8. The method of claim 1, wherein the step of establishing a point-to-point session between the multicast source and the intermediate device comprises establishing such session over an asynchronous transfer mode ATM virtual circuit.

9. The method of claim 1, wherein the step of establishing a point-to-point session between the multicast source and the intermediate device comprises establishing such session over a Frame Relay virtual circuit.

10. The method of claim 1, wherein the step of establishing a point-to-point session between the multicast source and the intermediate device comprises establishing such session over a PPP session over a SONET connection.

11. The method of claim 1, including maintaining data in the intermediate device mapping multicast groups in the set of multicast groups to receiving end stations for which multicast join messages have been received, and managing distribution of multicast messages received on the point-to-point session between the intermediate device and the source end station according to the data maintained in the intermediate device.

12. In a system including a network having one or more intermediate devices coupled to end stations by respective links, including a multicast source end station and a plurality of multicast receiving end stations coupled to an intermediate device in the network, a method for distributing multicast distribution functions to the intermediate device, comprising:

establishing point-to-point sessions between the source end station and the plurality of receiving end stations according to a Point-to Point Protocol PPP;

establishing a point-to-point session between the source end station and the intermediate device by which the source end station feeds multicast messages to the intermediate device directed to a set of multicast groups;

transmitting from end stations in the plurality of receiving end stations to the intermediate device respective multicast join messages in packets formatted according to the PPP in band of the point-to-point sessions between the source end station and the plurality of receiving end stations, the multicast join messages including information identifying one or more multicast groups for the respective receiving end stations to join, so that the intermediate device is enabled to forward multicast messages directed to a particular multicast group in the set of multicast groups to the receiving end stations which have joined the particular multicast group;

monitoring at the intermediate device packets formatted according to the PPP of the point-to-point sessions between the source end station and the plurality of receiving end stations to detect the multicast join messages; and forwarding multicast messages received at the intermediate station in the point-to-point session between the multicast source and the intermediate device, and directed to a particular multicast group in the set of multicast groups from the intermediate device to the receiving end stations which have joined the particular multicast group in band of the sessions point-to-point sessions between the source end station and the plurality of receiving end stations.

13. The method of claim 12, wherein the step of establishing a point-to-point session between the multicast source and the intermediate device comprises establishing a point-to-point session according to the communication protocol of the point-to-point session between the receiving end stations and the source end station.

14. The method of claim 12, wherein the step of establishing a point-to-point session between the multicast source and the intermediate device comprises establishing a point-to-point session according to a communication protocol different than the communication protocol of the point-to-point session between the receiving end stations and the source end station.

15. The method of claim 12, wherein the step of establishing a point-to-point session between the multicast source and the intermediate device comprises establishing such a session over an asynchronous transfer mode ATM virtual circuit.

16. The method of claim 12, wherein the step of establishing a point-to-point session between the multicast source and the intermediate device comprises establishing such session over a Frame Relay virtual circuit.

17. The method of claim 12, wherein the step of establishing a point-to-point session between the multicast source and the intermediate device comprises establishing such session over a PPP session over a SONET connection.

18. The method of claim 12, including maintaining data in the intermediate device mapping multicast groups in the set of multicast groups to receiving end stations for which multicast join messages have been received, and managing distribution of multicast messages received on the point-to-point session between the intermediate device and the source end station according to the data maintained in the intermediate device.

19. In a system including a network having one or more intermediate devices coupled to end stations by respective links, including a multicast source end station and a plurality of multicast receiving end stations coupled to a intermediate device in the network, a method for distributing multicast distribution functions to the intermediate device, comprising:

establishing a point-to-point session with the source end station and receiving end station according to a communication protocol;

transmitting, in-band of the point-to-point session with the source end station and receiving end station, from the receiving end station to the intermediate device a multicast join message, the multicast join message including information identifying a particular multicast group for the receiving end station to join, so that the intermediate device is enabled to forward multicast messages from the source end station and directed to a particular multicast group to the receiving end station.

20. The method of claim 19, wherein the communication protocol comprises a Point to Point Protocol PPP.

21. The method of claim 19, wherein the multicast join message comprises a data frame formatted according to the communication protocol of the point-to-point session between the receiving end stations and the source end station, and including a reserved field, and said transmitting to the intermediate device includes sending a data frame from the receiving end station in the session including an indicator in the reserved field that the data frame includes the multicast join message.

22. The method of claim 20, wherein the multicast join message comprises a data frame formatted according to the PPP, and including a reserved field, and said transmitting to the intermediate device includes sending a data frame from the receiving end station in the session including an indicator in the reserved field that the data frame includes the multicast join message, and the reserved field comprises a protocol field specified for PPP protocol identification functions.

* * * * *